Patented May 13, 1941

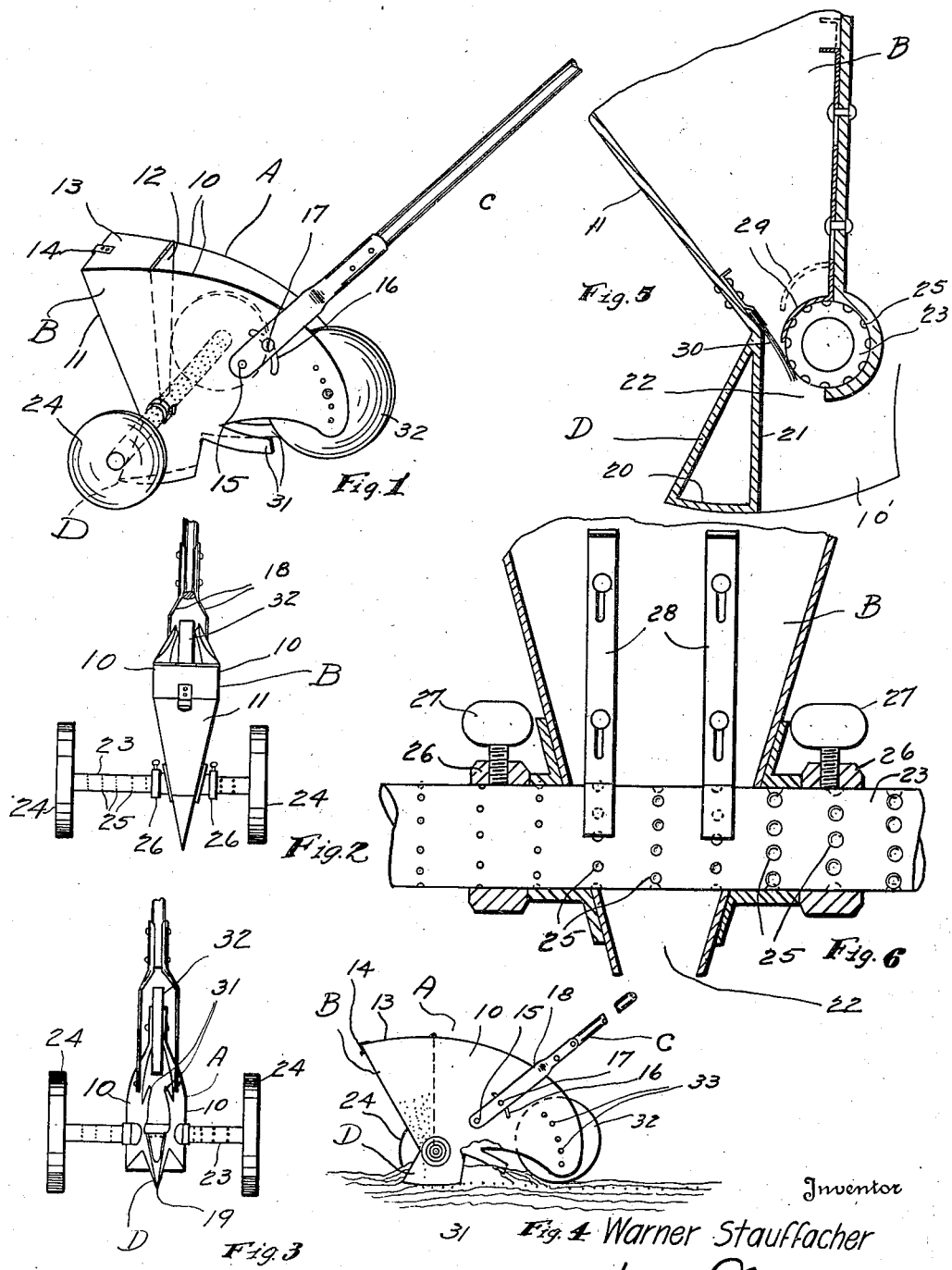

2,242,093

UNITED STATES PATENT OFFICE 2,242,093

SEEDER

Warner Stauffacher, Minneapolis, Minn.

Application June 18, 1938, Serial No. 214,477

7 Claims. (Cl. 111—78)

My invention relates to seeders or planters for planting different sizes and kinds of seeds and may be operated by hand to be readily moved over the ground where the seeding is to be done. A feature of primary importance resides in a seeder or planter having a simple construction and wherein different openings are provided in a common rotatable member so that seeds of various sizes and kinds may be picked up from the hopper and carried through the seeding throat to be planted in the ground. This common member provides the axle upon which the wheels are mounted which carry the forward end of the seeder or planter.

The seeder is formed with a construction so that it has a low center of gravity with the hopper positioned close to the ground and with a short seed dropping throat so that the seeding operation is more effective and can be properly timed in accordance with the shaft which has the openings for receiving the seeds to carry the same from the hopper.

The common shaft having different seed pockets formed within the surface of the same may be formed with several parallel rows of seed pockets about the surface so that several seeds may be picked up from the hopper if desired in the operation of the seeder. Further, I provide adjustable guard means for closing some of the pockets when desired.

The seeder includes a transverse adjustment of the common seed pocketed shaft, together with collar means for holding the shaft in any adjusted position which permits the shaft to be shifted transversely through the seed hopper to position the series of pockets in the shaft in the desired position in relation to the seed hopper as may be required.

Further, my seeder includes a plow for opening a furrow together with furrow closing blades back of the plow and seed throat, and an adjustable follower or caster wheel which rides over the closed furrow to pack the ground down over the seeds. This furrow packing wheel may be adjusted between the sides of the body of the seeder so as to raise or lower the point of the plow to regulate the depth of the furrow in which the seeds are dropped. I also provide a handle by which the seeder may be pushed and which is mounted in a manner to permit the free end of the handle to be dropped onto the ground without throwing the handle weight against the seeder and tipping the same by the dropping of the handle.

These features, together with other objects and advantages of my seeder will be more fully and clearly set forth in the specification and claims.

In the drawing forming a part of my specification:

Figure 1 is a perspective view of my seeder looking down on the same, the operating handle being partially broken away.

Figure 2 is a front perspective, looking down on the same.

Figure 3 is a bottom view of my seeder.

Figure 4 illustrates a side sectional view of my seeder, a portion of which is broken away and with the left front wheel removed from the shaft to show the general position of the seeder when in operation.

Figure 5 is a sectional detail of a portion of my seeder.

Figure 6 is a front sectional detail of a portion of my seeder.

My seeder A is of a very simple construction having a body portion formed of sheet metal, with side walls 10 acting to provide the sides of the seed hopper B. The seed hopper B is provided with a front wall 11 and a back wall 12.

The seed hopper B is provided with a cover 13 which is hinged to the top of the same and having a spring snap 14 for holding the cover normally closed.

The side walls 10 provide the side body portion of the seeder A and extend in an arcuated rearwardly direction to form the supporting means for the handle C. The handle C is pivotally connected to the side walls at 15 and is slidably connected to the same in the slot 16 by the bolt 17. These connections are made through the arms 18 which are spaced apart so as to operate over the rear portion of the sides 10 of the seeder. The arms 18 are attached in any suitable manner to the handle bar C. When the handle C is in operative position and engaged by the hand of the operator, it is free to slide over the sides 10, being held by the pivots 15 and should the operator at any time desire to let go of the handle, it will simply fall, the bolt 17 sliding in the slot 16 to the lower extremity thereof, or until the handle is stopped from further movement. By this means of attaching the handle, I provide a more substantial guiding means for the seeder A. A furrow plow D is formed by extending the side walls downward and connecting the same to provide the point 19. The forward end of the plow may be closed by the walls 20 and 21, the wall 20 with the depending portions 10' of the side walls forming the seed dropping throat 22, which is positioned directly below the pocketed common shaft 23 which supports the wheels 24 on the outer ends of the same.

The shaft 23 may be hollow or solid and is adapted to support the wheels 24 so that the forward end of the seeder A is carried in the desired manner over the ground in operation. The shaft 23 is formed with a series of pockets 25 which may be made of any suitable size and shape and which extend in a transverse plane around the shaft. Small holes 25 are provided for small seeds, whereas, larger holes are provided for larger seeds. The holes 25 being spaced in rows parallel to each other about the surface of the shaft 23, permit one or more row of holes to be used in planting seeds from the hopper B.

I provide a pair of collars 26 which are carried by the shaft 23 and are adapted to be positioned on either side of the hopper, being set in position by the thumb screws 27 to position the collar so that any row of holes 25 can be set to pick up seeds from the hopper B as more fully illustrated in Figure 6.

Within the hopper B I provide slidable guards 28 which may be moved up or down and when in the down position, the arcuated end 29 of the same fit over the rows of the holes 25 so as to close off some of the holes when it is desired. By means of a pair of these guards 28, I can set my seeder A so that only a single row of holes 25 will operate to pick up seeds from the hopper B and transmit the same to the seeding throat 22. It will be observed that the throat 22 is very short so that the seeds will drop quickly from the hopper B to the ground, so that they may be planted more evenly and accurately.

I provide an adjustable brush 30 which is slidably held to the front wall 11 of the hopper B and the bristles of which bear with a slight tension against the surface of the seed selecting shaft 23. The brush 30 provides the resilient means for engagement with the seeds to brush the same into the pockets 25 and prevent cracking of the seed and also to select the seed so that it won't pile up in the pockets. The brush 30 is of the same width as the hopper at the point where the seeds are picked up in the hopper and directed into the seeding throat 22. This brush may be of any suitable nature and provides a means of regulating the seed from the hopper to the seed selecting shaft.

In the operation of my seeder, the plow D opens a furrow in the ground, as illustrated in Figure 4, and the seed selector common shaft 23, which is operated by the wheels 24, rotates with the forward movement of the seeder A and drops the seed into the open furrow. As the seeder A moves forward, the furrow closing fingers 31 scrape the dirt over the seeds, closing the furrow, while the furrow packing wheel 32 packs the ground to completely close the furrow and press the seeds firmly into the ground.

My seeder operates very readily, may be made economically so that it will sell for a comparatively reasonable price within the range of most anyone, so that garden seeds may be more easily planted by the use of my seeder A. The wheel 32 is adjustably positioned in the series of holes 33 provided in the side walls 10 so that the depth of the furrow made by the plow D may be regulated.

While my seeder is of a very simple nature, it has the various features which are required to provide a practical planting or seeding means. The seeder may be quickly adjusted for the particular size seeds to be sown, and it may be made of any desired size; normally, however, it is designed for a hand operated seeder although it is not necessary to restrict it to this particular style or form. I desire to include in my invention a seeder of the character defined and within the scope of the following claims.

I claim:

1. A hand operated seeder including, side walls, a hopper formed between the front ends of said side walls, rearwardly projecting side portions on said side walls, a furrow packing wheel adjustably positioned between said side walls, furrow closing blades depending from and formed integral with said side walls, an integrally formed furrow opening plow depending from the forward bottom of said side walls, a seed selector shaft transversely adjustable and extending through the bottom of said seed hopper, wheels mounted on the ends thereof for rotating said shaft, and a series of different sized seed pockets formed in said shaft.

2. A seeder including a body portion, a seed hopper in said body portion, side walls projecting backward from said hopper, a furrow packing wheel adjustably positioned between said side walls, a seed selector shaft extending through the bottom of said hopper, said shaft having a series of seed pockets formed therein of different sizes, means for transversely adjusting said shaft to position any seed pockets selected in position in the hopper so as to pick up seeds therefrom, wheels for operating said shaft, a furrow forming plow on said body portion, and furrow closing fingers formed integrally with and projecting from said side walls and positioned directly ahead of said packing wheel.

3. A seeder mounted on wheels including a combined seed hopper and seed dropping throat, a handle secured thereto, a seed selector shaft axially movable with respect to said hopper and handle providing a common support for the wheels of the seeder and having a relatively short portion thereof extending through said combined hopper and dropping throat, a series of seed pockets formed in rows about the same, and means for setting said shaft in position with the desired predetermined size of seed pockets positioned in said hopper and dropping throat, so that when said seed shaft is rotated, the seeds from the hopper may be planted in the ground.

4. A seeder including a seed hopper, means on said hopper extending into the ground through which seeds may drop, an operating handle secured to said hopper, a common supporting axle and seed selector shaft having a series of different sized seed pockets formed in the surface thereof, said shaft extending through said hopper between said hopper and said means, and means for adjustably and rotatably supporting said shaft with respect to said hopper and handle to adjustably position said shaft with different sized seed pockets operable in said hopper, operating wheels secured to the ends of said shaft, and means for opening and closing a furrow as said seeder is moved along over the ground so that seeds from the hopper may be planted as the seeder moves along the ground.

5. A seeder including a body portion, a seed hopper and dropping throat formed therein, an operating handle secured thereto, a cover for closing said hopper, a seed selecting shaft rotatably supported and longitudinally adjustable with respect to said hopper and handle extending through said hopper and dropping throat, a series of rows of different size seed pockets formed transversely about said shaft, wheels on said shaft for supporting and operating said shaft, and means for holding said shaft in any adjusted position with different size seed sockets adapted to select seeds from said hopper.

6. A seeder comprising wheels, a seed selector shaft upon which said wheels are mounted, a body having a seed hopper formed therein through which said shaft extends, a plow means and furrow closing means formed integral with said body, spaced sides on said body extending rearwardly therefrom, a furrow packing wheel positioned centrally between the said spaced sides on said body, and handle means for operating said seeder.

7. A seeder comprising a hopper, shaft means supported in said hopper, a series of longitudinally spaced annular rows of pockets formed in said shaft, wheels mounted directly on said shaft for supporting said seeder, and strip-like means having an arcuated portion adapted to fit over a portion of said shaft to selectively cover said rows of pockets whereby some of said rows of pockets within said hopper may be covered to prevent seeds from entering the same.

WARNER STAUFFACHER.